United States Patent [19]
Ma

[11] Patent Number: 6,073,600
[45] Date of Patent: Jun. 13, 2000

[54] STRATIFIED CHARGED ENGINE

[75] Inventor: Thomas Tsoi-Hei Ma, South Woodham Ferrers, United Kingdom

[73] Assignee: Ford Global Technologies, Inc., Dearborn, Mich.

[21] Appl. No.: 09/077,423

[22] PCT Filed: Nov. 19, 1996

[86] PCT No.: PCT/GB96/02840

§ 371 Date: May 28, 1998

§ 102(e) Date: May 28, 1998

[87] PCT Pub. No.: WO97/20133

PCT Pub. Date: Jun. 5, 1997

[30]     Foreign Application Priority Data

Nov. 29, 1995 [GB] United Kingdom ................... 9524365
Mar. 26, 1996 [GB] United Kingdom ................... 9606286

[51] Int. Cl.[7] .......................... F02M 35/108; F02B 17/00
[52] U.S. Cl. ................. 123/184.43; 123/184.44; 123/184.53; 123/568.13; 123/568.17
[58] Field of Search .................. 123/308, 568.13, 123/568.17, 568.19, 184.42, 184.43, 184.45, 184.53

[56]         References Cited

U.S. PATENT DOCUMENTS

| 4,366,799 | 1/1983 | Suda | 123/568.19 |
|---|---|---|---|
| 4,413,593 | 11/1983 | Resler, Jr. | 123/568.19 |
| 4,856,473 | 8/1989 | Kawai et al. | 123/568.13 |
| 4,924,840 | 5/1990 | Wade | 123/568.19 |
| 5,653,202 | 8/1997 | Ma | 123/184.43 |

FOREIGN PATENT DOCUMENTS

| 0 594 462 A1 | 4/1994 | European Pat. Off. |
|---|---|---|
| 1 264 656 | 2/1972 | United Kingdom . |
| 1 279 079 | 6/1972 | United Kingdom . |
| 1 318 325 | 5/1973 | United Kingdom . |
| 1 574 628 | 9/1980 | United Kingdom . |

*Primary Examiner*—Willis R. Wolfe
*Assistant Examiner*—Hieu T. Vo
*Attorney, Agent, or Firm*—James J. Dottavio

[57]         ABSTRACT

A stratified charge internal combustion engine comprises at least one cylinder having at least one intake valve 14 per cylinder, and two manifolds 24, 34 having branches 22, 32 supplying first and second gas streams to at least one intake valve of each cylinder. The two streams enter the cylinder separately through different regions of the valve 14 so as to produce a stratified charge within the engine cylinder. The first manifold 24 supplies a stream comprising air within which fuel to be burnt is dispersed and the second manifold 34 supplies a stream comprising dilution gases. Each of the two manifolds 24, 34 has a plenum chamber and the plenum chambers of the two manifolds are connected to a common air supply throttle 50. The plenum chamber 34 of the second manifold is additionally connected to an exhaust gases recirculation (EGR) pipe 84 from the exhaust system of the engine through an EGR throttle 54 of similar design to and mechanically ganged with the air supply throttle 50. The EGR pipe 84 supplies exhaust gases directly into the second stream to form part of the gases in the second stream. The relative quantity of air in the first stream supplied by the first manifold 24 as a fraction of the total quantity of air supplied to the two manifolds 24, 34 is variable and determined by the setting of the relative quantity of EGR flow as a fraction of the total air flow.

16 Claims, 4 Drawing Sheets

STRATIFIED CHARGED ENGINE

FIELD OF THE INVENTION

The present invention relates to an internal combustion engine having exhaust gas recirculation (EGR) and is particularly concerned with the control of the quantity of exhaust gases recirculated to the engine intake system.

BACKGROUND OF THE INVENTION

WO96/01688 relates to a stratified charge internal combustion engine comprising at least one cylinder having at least one intake valve per cylinder, and two manifolds having branches supplying first and second gas streams to at least one intake valve of each cylinder, the two streams entering the cylinder separately through different regions of the valve so as to produce a stratified charge within the engine cylinder, the first manifold supplying a stream comprising air within which fuel to be burnt is dispersed and the second manifold supplying a stream comprising dilution gases, in which the two manifolds are connected separately to respective sources of air and dilution gases, each controlled by separate throttles. The dilution gases could be exhaust gases from an EGR system.

Depending on the relative degree of throttling applied to the two separate throttles, these arrangements may cause different equilibrium Pressures in the plenum chambers of the two manifolds and such pressure difference would set up balancing flows between the branches of the two manifolds at the intake port ends where these branches are connected at the vicinity of the intake valve. The balancing flows are undesirable when a stratified charge is required because they blur the distinction in gas composition of the two streams which should be kept separate from one another until the two streams enter the combustion chamber.

In WO96/10688, it is proposed to use a check valve in each branch of the first manifold to prevent the balancing flows in one direction. GB-A-2 306 194 proposes ganging the throttles and operating them in unison to ensure a fixed ratio between the air and dilution flows through the respective manifolds, the flow ratio being such that the pressure drops along the two sets of manifold branches are substantially equal so that there is no pressure difference between the plenum chambers of the two manifolds.

GB-A-2 306 194 describes an engine in which the relative velocities of the two streams at the intake valve as they enter the combustion chamber are kept constant so as to maintain a fixed pattern of charge motion within the combustion chamber which minimises mixing between the two streams and thereby conserve stratification for as long as possible during the intake and compression strokes of the engine.

In WO97/01397, it is proposed to use a flow obstructing means in each branch of the first manifold to adjust the relative volume flows through the two manifolds in order to maintain the same pressure drop along the branches of the two manifolds while allowing the velocity ratio of the two streams passing over the intake valve to be selected at a desired value according to the resulting volume flow ratio and the local flow cross-sections of the two streams at the intake valve.

All the above co-pending patent applications depend on the volume flow ratio between the air and the dilution streams in the respective manifolds being set at a predetermined value at which there is no balancing flow between the two sets of branches at the intake port ends and at which the velocity ratio of the two streams at the intake valve is maintained at a predetermined value for minimum mixing. This limits the control of the two streams to a very specific narrow range over which both conditions are met and any deviation from that range would reduce the effectiveness of the eventual charge stratification within the combustion chamber.

WO95/22687 represents the closest prior art to the present invention. The embodiment in the latter reference described by reference to its FIG. 5 is a stratified charge internal combustion engine comprising at least one cylinder having at least one intake valve per cylinder, and two manifolds having branches supplying first and second gas streams to at least one intake valve of each cylinder, the two streams entering the cylinder separately through different regions of the valve so as to produce a stratified charge within the engine cylinder. The first stream supplied by the first manifold comprises air within which fuel to be burnt is dispersed and the second stream supplied by the second manifold comprises dilution gases. Each of the two manifolds has a plenum chamber and the plenum chambers of the two manifolds are connected to a common air supply throttle. The plenum chamber of the second manifold is additionally connected to an exhaust gases recirculation (EGR) pipe from the exhaust system of the engine through an EGR throttle, the EGR pipe supplying exhaust gases directly into the second stream to form part of the gases in the second stream.

In the latter reference, the pressures In the two manifold plenums are not matched at all times with the result that cross flow between the manifolds can occur through the intake ports, which if allowed to occur would detract from the charge stratification.

OBJECT OF THE INVENTION

The present invention has the same aim as the co-pending patent applications of achieving good charge stratification by preventing balancing flows and creating the desired velocity ratio in the layered streams entering the combustion chamber, but seeks to provide a flow control system including EGR which is simpler and more robust.

SUMMARY OF THE INVENTION

According to a first aspect of the present invention, there is provided a stratified charge internal combustion engine comprising at least one cylinder having at least one intake valve per cylinder, and two manifolds having branches supplying first and second gas streams to at least one intake valve of each cylinder, the two streams entering the cylinder separately through different regions of the valve so as to produce a stratified charge within the engine cylinder, the first stream supplied by the first manifold comprising air within which fuel to be burnt is dispersed and the second stream supplied by the second manifold comprising dilution gases, wherein each of the two manifolds has a plenum chamber and the plenum chambers of the two manifolds are connected to a common air supply throttle, and wherein the plenum chamber of the second manifold is additionally connected go an exhaust gases recirculation (EGR) pipe from the exhaust system of the engine through an EGR throttle, the EGR pipe supplying exhaust gases directly into the second stream to form part of the gases in the second stream, characterised in that EGR throttle and the air supply throttle are of similar design and are mechanically ganged for operation in synchronism with one another, and in that the gas pressure in the EGR pipe upstream of the EGR throttle is regulated by a pressure regulator, whereby the quantity of air in the first stream supplied by the first manifold as a fraction of the total quantity of air supplied to the two manifolds is variable by the setting of the pressure regulator which determines the quantity of EGR flow as a fraction of the total air flow.

According to a second aspect of the invention, there is provided a stratified charge internal combustion engine comprising at least one cylinder having two intake valves per cylinder, and two manifolds having branches supplying first and second gas streams to the respective intake valves of each cylinder, the two streams entering the cylinder separately through different valves so as to produce a stratified charge within the engine cylinder, the first stream supplied by the first manifold comprising air within which fuel to be burnt is dispersed and the second stream supplied by the second manifold comprising dilution gases, wherein each of the two manifolds has a plenum chamber and the plenum chambers of the two manifolds are connected to a common air supply throttle, and wherein the plenum chamber of the second manifold is additionally connected to an exhaust gases recirculation (EGR) pipe from the exhaust system of the engine through an EGR throttle, the EGR pipe supplying exhaust gases directly into the second stream to form part of the gases in the second stream, characterised in that EGR throttle and the air supply throttle are of similar design and are mechanically ganged for operation in synchronism with one another, and in that the gas pressure in the EGR pipe upstream of the EGR throttle is regulated by a pressure regulator, whereby the quantity of air in the first stream supplied by the first manifold as a fraction of the total quantity of air supplied to the two manifolds is variable by the setting of the pressure regulator which determines the quantity of EGR flow as a fraction of the total air flow.

The first and second aspects of the invention differ from each other in that, in the first aspect the different gas streams contact one another in the intake port and enter the combustion chamber through a common valve, whereas in the second aspect, the different gas streams come into contact with one another within the combustion chamber and enter through different intake valves. Because the manifold construction and the flow control can be the same in both aspects, the invention will be described by reference to an engine of the first aspect but it should be understood that, except where otherwise stated, the description could apply equally to an engine in which the gas streams enter the combustion chamber through separate intake valves.

Because of the fact that in the present invention, when two manifolds are present, they are supplied through a common air supply throttle instead of through the separate throttles of the earlier proposals discussed above, the equilibrium pressure in the plenum chambers of the two manifolds is the same at all flow settings and no balancing flow can occur between the two sets of manifold branches at the intake port ends. The EGR flow which is connected to the second plenum would take up a variable fraction of the second stream and may therefore be set over a wide range without significantly affecting the combined flow in the second stream that is comprised partly of air from the air supply throttle and partly of EGR gases. As a result the velocity ratio of the first and second streams at the intake valve will remain the same even though the EGR flow may be varied over a wide range, and consequently the pattern of the charge stratification entering the combustion chamber and the conservation of the stratification thereafter is not affected by the introduction of EGR gases. This represents a significant improvement over the earlier proposals in the co-pending patent applications by reducing the sensitivity of the quality of charge stratification to variations in the EGR flow.

Moreover, the variation in EGR flow may intentionally be used in the present invention to achieve a wide range of overall air/fuel ratio calibrations for the engine while maintaining substantially a similar pattern of charge stratification within the combustion chamber. The quantity of air in the first stream into which fuel is to be dispersed may be estimated by taking into account the total air supply to the two streams and the displacement of air by the EGR gases in the second stream. This quantity of air may be used directly for metering fuel into the first stream to give a desired air/fuel ratio in the core layer of the stratified charge as the two streams enter the combustion chamber.

When the EGR flow is zero, the second stream will be comprised entirely of air and the engine will operate as a stratified charge engine with a rich or stoichiometric core mixture and an overall very lean air/fuel ratio. In this case, while a three-way catalytic converter will be effective in removing the HC and CO pollutants in the exhaust gases by oxidation, a lean $NO_x$ catalyst or a $NO_x$ trap will be required to remove the $NO_x$ pollutant in the prevailing oxygen rich environment of the exhaust gases discharged from the stratified charge lean burn engine.

Increasing the flow of EGR gases into the second stream will progressively replace the air content in the second stream with exhaust gases, without significantly altering the combined flow of the second stream or the relative velocities of the first and second streams at the intake valve which determines the initial pattern of charge stratification within the combustion chamber. In these cases, the overall air/fuel ratio of the stratified charge will be progressively less lean as the dilution air in the second stream is replaced by dilution exhaust gases. This has the advantage of increasing the temperature of the exhaust gases compared with the pure air stratification case, and reduces the risk of the catalytic converter becoming too cold under low engine load conditions.

When the EGR flow equals or exceeds the flow capacity of the second manifold, the second stream will be comprised only of EGR gases and any excess EGR flow would spill across the common upstream ends of the two manifolds and contribute to some EGR in the first stream now consisting of all the air from the air supply throttle. Under these conditions, the fuel supplied to the first stream forming the core mixture may be calibrated stoichiometrically and the charge in the combustion chamber is stratified entirely with EGR gases. A three-way catalytic converter may be used in this case in the exhaust system to remove the three major pollutants HC, CO and $NO_x$ in the exhaust gases by redox reaction.

In the invention, parallel flow of the air and EGR gases along the first and second manifold branches, respectively, is ensured because each branch of the first and second manifolds are connected at both the inlet and outlet ends, and the pairs of branches are simultaneously subjected to substantially the same induction pressures as each cylinder undergoes its intake stroke. Apart from minor resonance wave effects within the manifolds, there will be little phase difference in the induction pressure along each set of branches to cause any balancing flow between the branches.

In all the above cases of charge stratification: namely, by EGR gases, by air or by a mixture of The two, the pumping work of the engine is significantly reduced compared with a homogeneous charge engine and the fuel economy of the engine is improved. Moreover, the same fuel metering strategy may be used regardless of the composition of the second stream since only the core mixture in the first stream is calibrated to a desired air/fuel ratio.

In order to simplify and to ensure reliable control of the EGR gases relative to the air supply, it is preferred to use butterfly throttles for both the EGR throttle and the air supply throttle. In this manner, the volume flow ratio between the EGR gases and the air supply, i.e., the EGR dilution ratio, will be substantially constant for a wide range of throttle positions.

The exhaust pressure regulator arranged upstream of the EGR butterfly throttle provides a constant delivery pressure to the EGR butterfly throttle even though the pressure in the engine exhaust system may vary. By modifying the control setting of the pressure regulator by means of engine manifold vacuum or by an electric solenoid, the regulated delivery pressure may be altered to vary the EGR dilution ratio in different regions of the engine operating map, whilst the ganged throttles ensures fast and reliable response in each region of EGR dilution. For maximum engine power output, the pressure regulator can be shut off completely to prevent exhaust gas recirculation.

In the present invention, because the first and second manifolds are connected at both ends and are throttled in common, the volume flow ratio of the first and second streams is primarily determined by the ratio of the effective flow cross-sections of the two streams at the intake valve. The velocity ratio of the two streams at the intake valve (being flow/area) would always be unity. This is the desired condition for conserving sandwich stratification where the stratified layers are formed of vertical planes moving at the same velocity.

On the other hand, in order to conserve radial or envelope stratification where the stratified layers are formed of concentric axial and transverse cylinders, respectively, the desired velocity ratio of the layered streams should be different from unity and proportional to the swirl radius in order to preserve a solid body rotation in the charge. WO97/13967 describes a flow obstructing means positioned sufficiently upstream of the intake port for adjusting the volume flow through the manifold independently of the effective flow cross-section at the intake port. The preferred embodiment of this co-pending patent application allows the velocity ratio of the two streams at the intake port to be set different from unity if desired and is equally applicable in the present invention where a radial or envelope stratification is to be achieved.

BRIEF DESCRIPTION OF THE DRAWINGS

The invention will now be described further, by way of example, with reference to the accompanying drawings, in which.

DETAILED DESCRIPTION OF THE INVENTION

Figure 1:
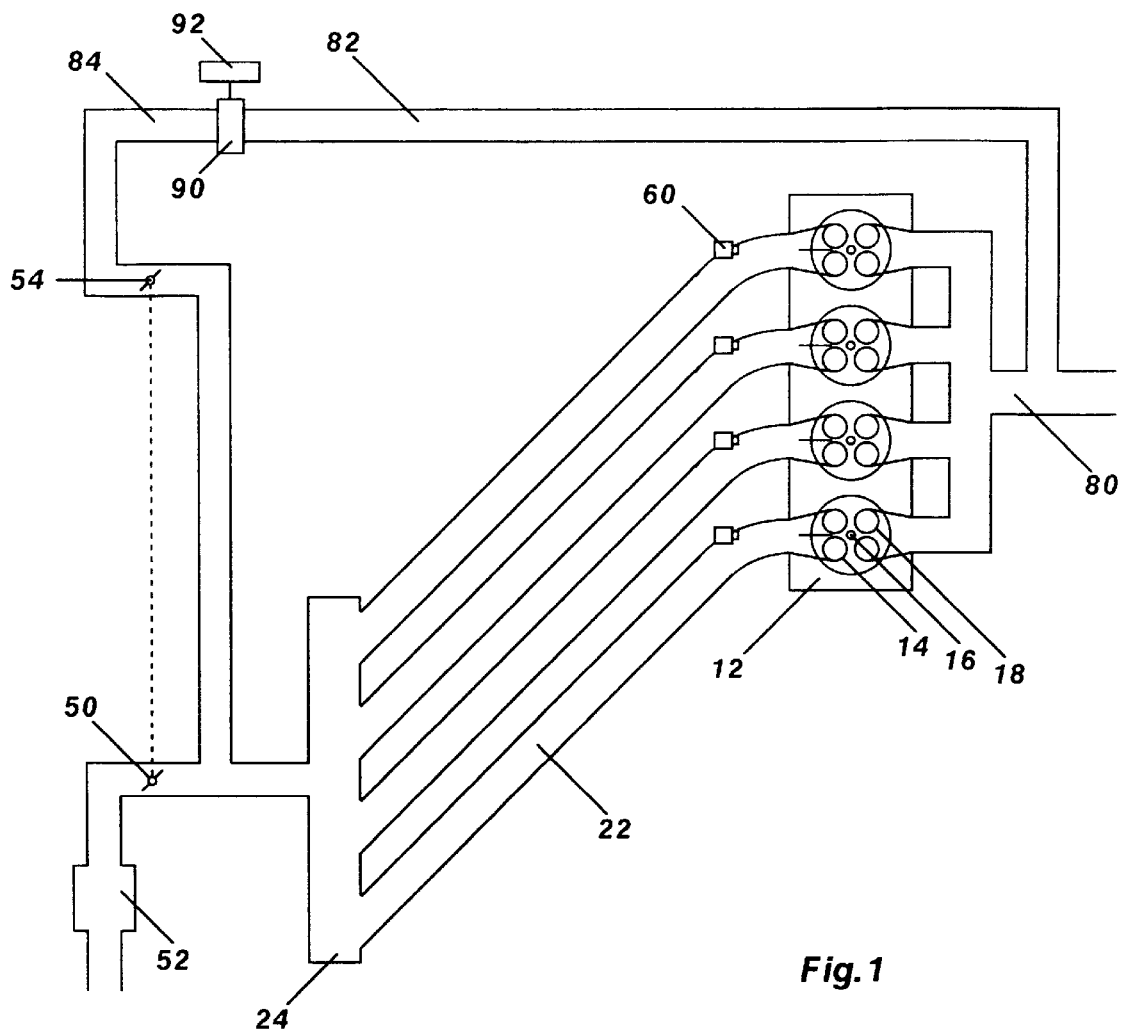
FIG. 1 is a schematic representation of an engine constructed in accordance with the first aspect of the invention.

In all following description of the different embodiments of the invention, like components have been designated by like reference numerals in order to avoid unnecessary repetition.

The engine 12 of FIG. 1 has a first intake manifold having a plenum chamber 24 and branches 22 each leading to the two intake valves 14 of a respective cylinder. Each cylinder has a spark plug 16 and two exhaust valves 18. An exhaust manifold 80 includes an EGR pipe 82 that recirculates part of the exhaust gases to the intake system.

The plenum chamber 24 of the intake manifold is connected to ambient air through a butterfly main throttle 50 and a mass air flow meter 52. The EGR gases are introduced into the intake system between the butterfly main throttle 50 and the plenum chamber 24 by way of a section 84 of the EGR pipe that contains a second butterfly throttle 54. The pressure of exhaust gases supplied to the section 84 of the EGR pipe is regulated by a pressure regulator comprising a valve 90 and an actuator 92. Fuel in this embodiment is introduced by port injection by means of fuel injectors 60.

The two throttles 50 and 54 are of similar design and are ganged mechanically for simultaneous operation with one another. If the supply pressures to the two throttles remain constant, that is to say for a fixed seating of he exhaust pressure regulator 90, 92, and a fixed ambient air pressure, the ratio of EGR gases to air into the plenum chamber 24 will be constant regardless of the position of the two throttles 50, 54.

The throttles 50 and 54 are matched in cross-section and the exhaust delivery pressure set by the pressure regulator 90, 92 may be at ambient pressure giving rise to an overall EGR dilution of 50%. Once this pressure has been set in the section 84 of the EGR pipe, the EGR dilution ratio will not change with throttle position. However, the EGR dilution ratio can be changed for different operating ranges of the engine to vary the EGR dilution rate from zero to in excess of 50% by varying the setting of the pressure regulator.

The setting of the pressure regulator 90, 92 may be controlled electrically or by vacuum and its speed of response is not critical as it does not attempt to follow changes in throttle pedal position but merely selects the engine operating mode.

Figure 2:
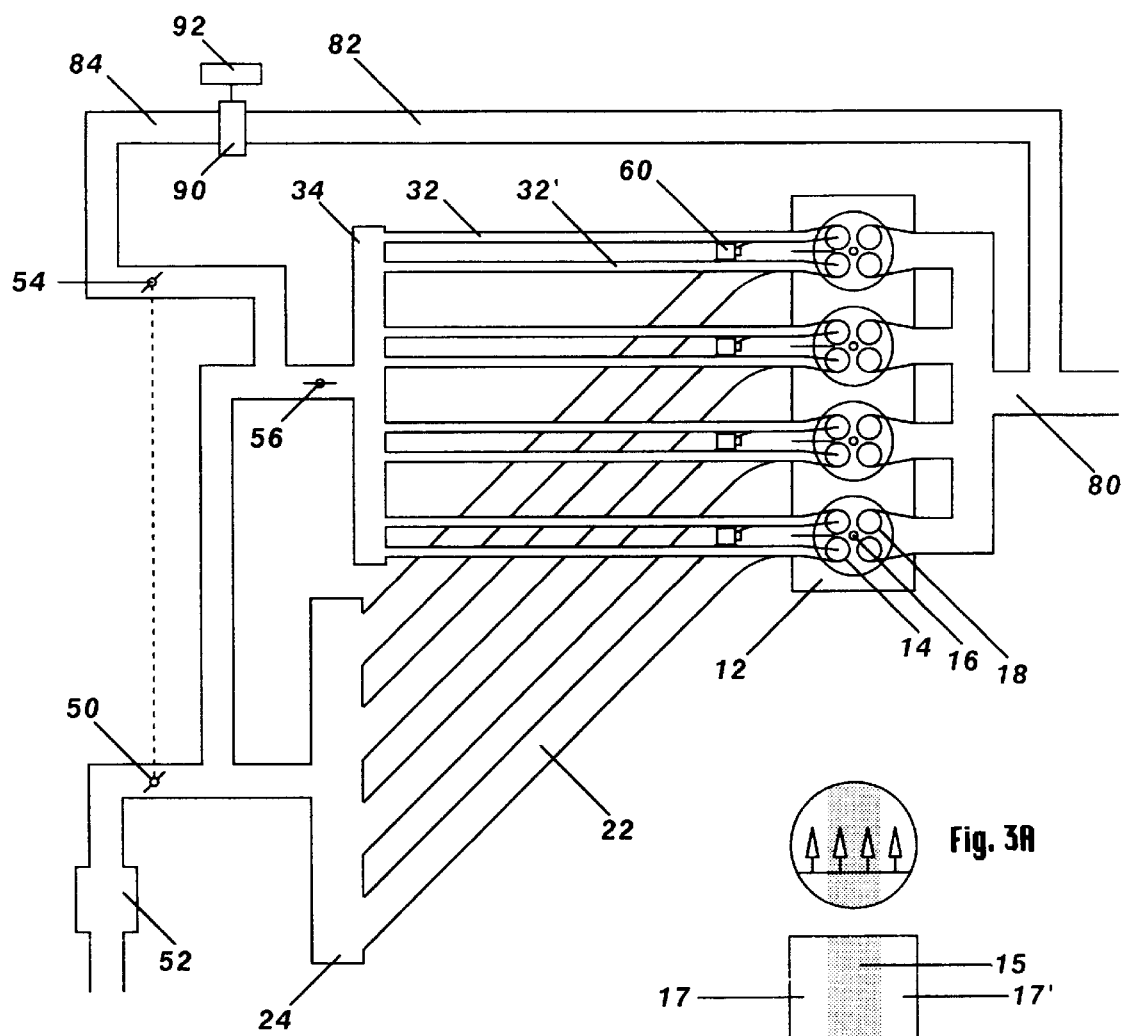
FIG. 2 is a schematic representation of an engine constructed in accordance with the invention.

A second intake manifold as shown in FIG. 2, has a plenum chamber 34 and two branches 32, 32' leading to respective ones of the two intake valves of each cylinder, the branches supplying the sides of the valves that are furthest from each other in the intake port. The plenum chamber 34 is connected through a connecting pipe containing a shut-off valve 56 to a point along the section 84 of the EGR pipe disposed between the EGR throttle 54 and the plenum chamber 24 of the first manifold.

Figure 3A:
FIGS. 3 and 3A show vertical and horizontal sections through a combustion chamber of the engine in FIG. 2, to illustrated the nature of the resulting charge stratification.
Figure 3:
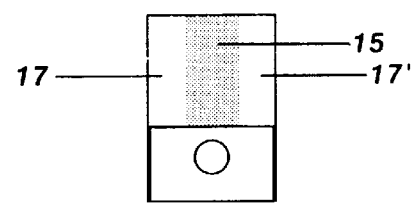

The intake system of the engine in FIG. 2 is designed to produce a stratified charge in the form of a vertical sandwich in the combustion chamber best understood by reference to FIGS. 3 and 3A. The branches 32, 32' supply dilution gases 17, 17' whereas the central sections of the two valves supply a core 15 of fuel-laden air that is shown shaded in FIGS. 3 and 3A. The view of FIGS. 3 and 3$a$ show a vertical and a plan view of this intake charge, the arrows in the plan view representing the tumbling motion of this vertical sandwich as the charge is drawn into the combustion chamber.

In addition to aiming the different gas streams correctly, it is important to match their velocities if this stratification is to be maintained during the course of the induction and compression strokes. The intake system is therefore designed to achieve a variable EGR dilution yet one in which the velocities of the core and dilution streams are always matched to maintain the correct conditions for conserving charge stratification up to the instant of ignition.

The two plenum chambers 24 and 34 are connected to one another and are therefore at the same pressure. The velocity of the two streams passing the intake valves from the respective manifolds, being mainly determined by the pressure drop across the branches, will also therefore always be the same. The volume flow ratio of the two streams will be determined by the relative cross-section areas of the branches 22 and 32, 32' near the intake valves and this too will be constant regardless of the position of the main throttle 50. The combustion charge will therefore always has a certain ratio of dilution gases 17, 17' to fuel-air core mixture 15 to maintain the optimum conditions for stratification throughout a control load range. Therefore, for as long as the shut-off valve 56 is open, the engine will operate with a stratified charge limiting the maximum output power of the engine but achieving improve fuel economy through the increased dilution. For maximum power output the shut-off valve 56 is closed whereupon the engine will operate with a homogeneous charge, the second manifold 34 serving as a balancing manifold distributing the charge between the different cylinders. At the same time, the pressure regulator 90, 92 should be set to reduce the delivery pressure to the section 84 of the EGR pipe to reduce the EGR dilution to the engine.

While operating in the stratified charge mode, it is possible to vary the composition of the dilution gases 17 from pure air to 100% EGR depending upon the setting of the pressure regulator 90, 92 and, throughout this mode of operation, load is varied by altering the position of the ganged throttles 50, 54. If the regulator 90, 92 supplies a pressure equal to the ambient pressure, then there will be no pressure drop across the section of the EGR pipe lying between the two throttles 50 and 54 and no gas flow between the manifolds. All the EGR gases will enter the plenum chamber 34 while an equal amount of air will enter the plenum chamber 24 with the result that within the combustion charge the dilution gases 17, 17' will consist solely of EGR gases. On the other hand, at the other extreme, if the pressure regulator 90, 92 is shut off, then air passing the main throttle 50 will be divided equally between the two manifolds with the result that within the combustion charge the dilution gases 17, 17' will consist solely of air. Between these two extremes any desired EGR dilution can be achieved by setting the pressure regulator 90, 92, and once set, that EGR dilution ratio will be maintained regardless of throttle position.

If the pressure regulator is opened still further, because the exhaust gas pressure is higher than ambient pressure, it is possible, in addition to filling the second manifold with EGR gases, to establish a small flow of EGR gases into the first manifold. This will mean that the core mixture will contain a small proportion of EGR gases, which can help to reduce $NO_x$.

The proportion of the air drawn through the mass air flow meter 52 reaching the fuel-air core mixture 15 in the combustion charge will in this case depend upon the setting of the pressure regulator 90, 92. When the regulator is shut off, then 50% of the measured air reaches the fuel-air core mixture 15, and When the regulator is set to or above ambient pressure, then all the measured air reaches the fuel-air core mixture 15. Thus the air in the fuel-air core mixture 15 can be computed as a function of the total mass air flow through the throttle 50 and the setting of the exhaust pressure regulator 90, 92, and this computed value may be used in the control of the quantity of fuel injected through the fuel injectors 60.

The optimum EGR dilution ratio is determined in dependence upon several factors. For stoichiometry of the exhaust gases, as may be required when using a three-way catalytic converter, the dilution gases should consist only of EGR gases. On the other hand, for best fuel economy, zero EGR in the dilution gases is preferred but this requires a lean $NO_x$ catalyst or $NO_x$ trap in the exhaust system. Even with an excess of oxygen in the exhaust gases, one may wish to introduce a proportion of EGR into the dilution gases to maintain a higher exhaust gas temperature for ensuring correct operation of the catalytic converter. Certain other regimes may require the engine to be operated with excess oxygen in the exhaust gases most of the time and resort to short bursts of stoichiometric or rich operation to purge the $NO_x$ trap. Any such control strategy can readily be accommodated in the embodiment in FIG. 2.

Figures 4, 5, 5A:
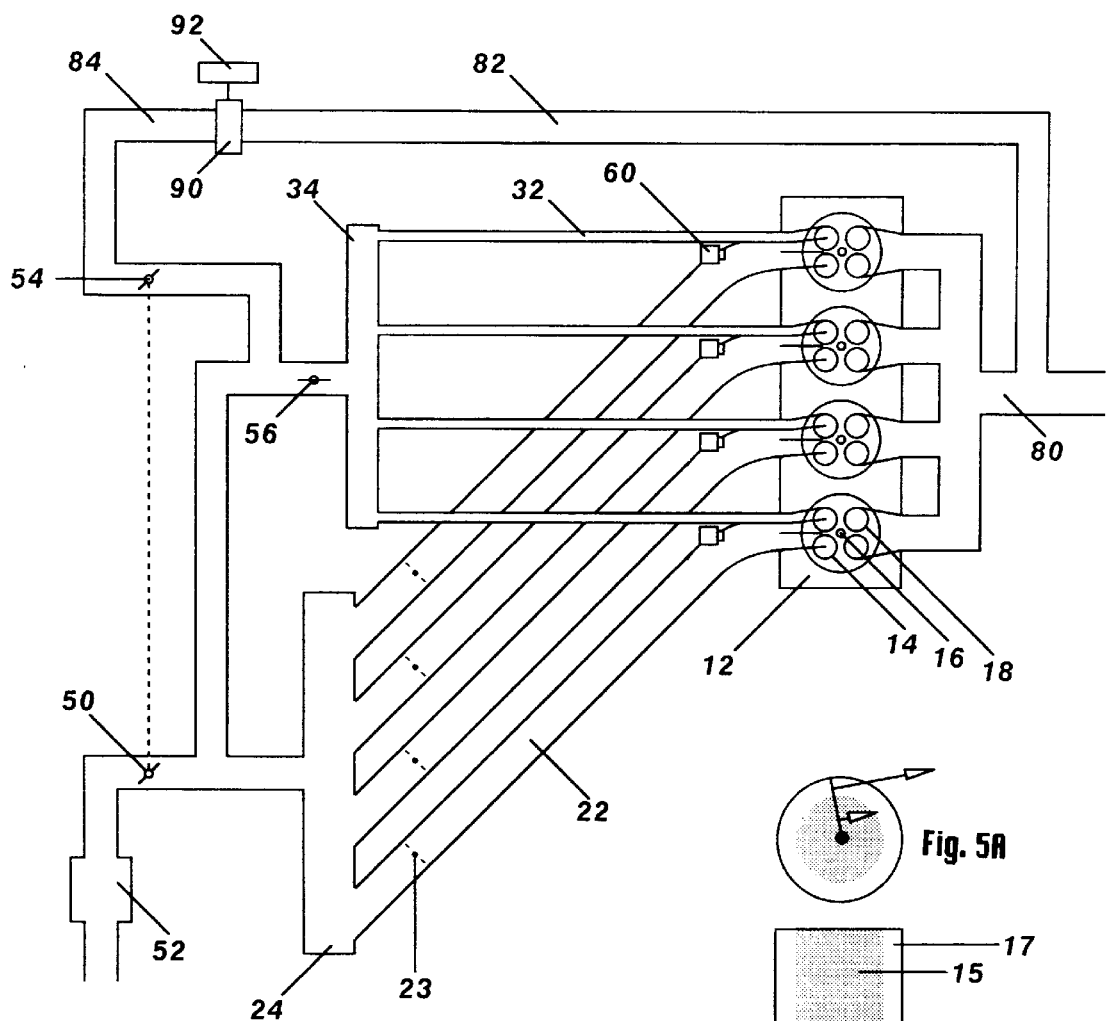
FIGS. 4, 5 and 5A are similar to FIGS. 2, 3 and 3A, and show a further embodiment of an engine constructed in accordance with the first aspect of the invention.

Referring now to FIGS. 4, 5 and 5A this embodiment contains flow obstructing means 23 in the branches 22 of the first manifold but otherwise has no components that have not been described by reference to FIGS. 2, 3 and 3A. The essential difference lies in the configuration of the branches 32 of the second manifold and the resulting form of charge stratification.

The embodiment of FIG. 4 as seen in FIGS. 5 and 5A produces a radial stratification that consist of a central cylindrical core 15 of fuel-air mixture and a surrounding annulus or sleeve 17 of dilution gases. Whereas sandwich stratification requires matched velocities between the core and dilution streams, radial stratification requires a higher velocity in the dilution stream if solid body rotation is to ensue. The effect of the flow obstructing means 23 is to match the cross-section of the branches of the first manifold to the minimum flow cross-section in the branches of the second manifold thereby equalizing the volume flows in the two manifolds. The length of the branches 22 downstream of the flow obstructing means 23 allows complete flow transition through a larger cross-section so that at the intake port the velocity of the core stream will be lower than that of the dilution stream in the ratio of their respective areas at the intake port.

The flow obstructing means 23 are shown as butterfly throttles with perforated plates. In the closed position illustrated in FIG. 4, the matching of the flow cross-sections through the two manifolds achieves a velocity ratio of approximately 3:1 between the dilution and core streams as they enter the combustion chamber shown in FIG. 5 while the volume ratio is 1:1. This is the desired condition to conserve a radial charge stratification through the compression stroke. However, by opening these flow obstructing throttle plates 23, the velocity ratio reverts to 1:1, the volume ratio reverts to 1:3, the flow field in the cylinder changes to tumble, and the necessary conditions to conserve charge stratification will be destroyed allowing the engine to be operated with a homogeneous charge. At the same time, the pressure regulator 90, 92 should be set to a reduced delivery pressure to the section 84 of the EGR pipe to reduce the EGR dilution to the engine. The effect is therefore equivalent to closing the shut-off valve 56 in that either means achieves a homogeneous charge.

Figure 6:
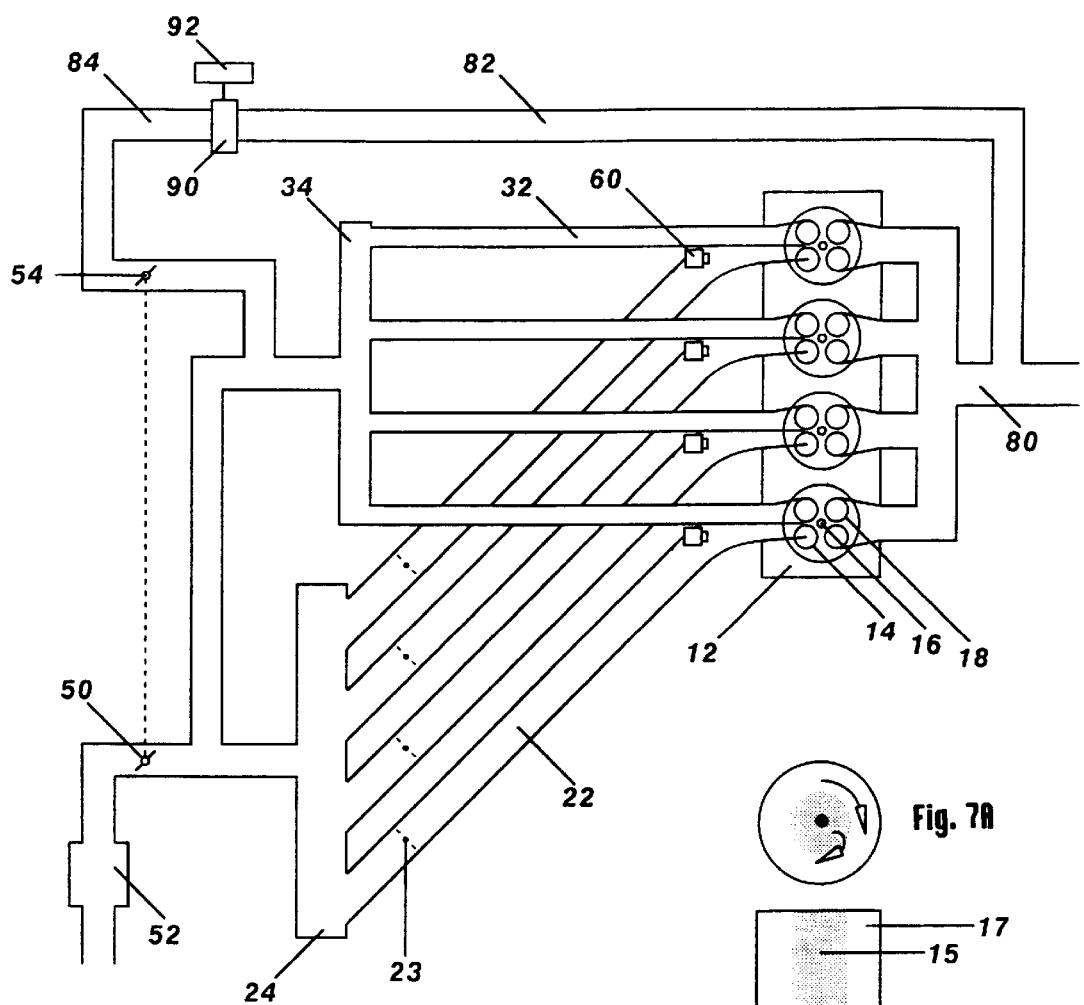
FIGS. 6, 7 and 7A are once again similar to FIGS. 2, 3 and 3A, and show an engine constructed in accordance with the second aspect of the invention.
Figure 7A:
Figure 7:
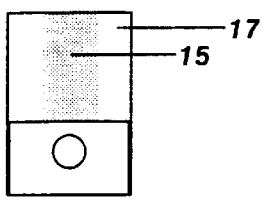

The embodiment of FIGS. 6, 7, and 7A is generally similar to that of FIGS. 4, 5 and 5A and differs from it in the following respects. The branches of the first and second manifolds in this embodiment supply different intake valves and are sized to have comparable flow cross-sections. The shut-off valve 56 has been omitted as the second manifold can now no longer act as a balancing manifold. The intake ports are designed such that the dilution stream is directed tangentially and the core stream is swirled.

The important difference is in the volume ratio of the two streams within the combustion chamber which is made clear from a comparison of FIGS. 5 and 7. This embodiment has dilution stream and core stream that have a velocity of 3:1 as well as a volume ratio of 3:1. The function of the flow obstructing means 23 in this case is not to match the flow cross-sections between the two manifolds, but to reduce the volume flow of the core stream. There will now be a pressure difference between two plenum chamber 24 and 34 on account of the throttling by the obstructing means 23 with the result that in addition to filling the first manifold with air, some of the air passing the main throttle 50 will spill over into the second manifold such that even when operating with maximum EGR, there will be air in the dilution stream. With the volume ratios of 3:1 between the dilution and core streams, this will mean a 2:1 EGR to air ratio in the dilution stream.

It is assumed above that the throttles 50 and 54 are of equal size, but it is possible to make the EGR throttle 54 larger than the air supply throttle 50 if one wishes to increase further the EGR content in the dilution stream.

As in the embodiment of FIGS. 4 and 5, opening the flow obstructing throttles 23 will destroy the conditions for a sustainable stratification and restore the engine to a homogeneous charge engine with 50% of the gas charge entering through each valve. The overall proportion of EGR must again be reduced by appropriate setting of the pressure regulator 90,92 to permit stable combustion.

In conclusion, it will be seen from the above description of its various embodiments, that the invention provides greater flexibility of She flow control system in that the quantity of EGR gases and the quality of charge stratification are separate parameters capable of being set independently of each other and not affected by one another as one or the other is varied.

I claim:

1. A stratified charge internal combustion engine comprising at least one cylinder having at least one intake valve (14) per cylinder, and two manifolds having branches (22, 32) supplying first and second gas streams to at least one intake valve (14) of each cylinder, the two streams entering the cylinder separately through different regions of the valve (14) so as to produce a stratified charge within the engine cylinder, the first stream supplied by the first manifold comprising air within which fuel to be burnt is dispersed and the second stream supplied by the second manifold comprising dilution gases, wherein each of the two manifolds has a plenum chamber (24,34) and the plenum chambers of the two manifolds are connected to a common air supply throttle (50), and wherein the plenum chamber (34) of the second manifold is additionally connected to an exhaust gases recirculation (EGR) pipe (84) from the exhaust system of the engine through an EGR throttle (54), the EGR pipe (84) supplying exhaust gases directly into the second stream to form part of the gases in the second stream, characterised in that EGR throttle (54) and the air supply throttle (50) are of similar design and are mechanically ganged for operation in synchronism with one another, and in that the gas pressure in the EGR pipe (84) upstream of the EGR throttle (54) is regulated by a pressure regulator (90), whereby the quantity of air in the first stream supplied by the first manifold as a fraction of the total quantity of air supplied to the two manifolds is variable by the setting of the pressure regulator (90) which determines the quantity of EGR flow as a fraction of the total air flow.

2. An internal combustion engine as claimed in claim 1, wherein the air supply throttle (50) and the EGR throttle (54) are both constructed as butterfly throttles.

3. An internal combustion engine as claimed in claim 2, wherein fuel is metered in dependence upon the estimated quantity of air supplied to the first gas stream.

4. An internal combustion engine as claimed in claim 3, wherein fuel is metered stoichiometrically with the estimated quantity of air supplied to the first gas stream.

5. An internal combustion engine as claimed in claim 3 wherein fuel is metered as a spray into the plenum chamber (24) of the first manifold.

6. An internal combustion engine as claimed in claim 3 wherein fuel is separately metered as a spray into each branch (22) of the first manifold.

7. An internal combustion engine as claimed in claim 1, wherein the streams of gases from the branches of the first and second manifolds are maintained separate by a physical partition until they reach the vicinity of the intake valve and are thereafter inducted in parallel into the combustion chamber without significantly mixing with one another.

8. An internal combustion engine as claimed in claim 7, wherein the branches of the first and second manifolds are designed to give substantially parallel swirling flows, travelling at different relative velocities in proportion with their respective swirl radii into the combustion chamber, so as to produce a layered swirling charge motion undergoing substantially solid body rotation within the combustion chamber and wherein flow obstructing means are provided in each branch of the first manifold to vary the relative effective flow cross-sections of the first and second manifolds in order to vary the relative volume flows of the first and second streams, the flow obstructing means being positioned at a sufficient distance upstream of the intake port for the increased velocity at the flow obstructing means to be dissipated before reaching the intake port, such that the relative velocities of the first and second streams at the intake valve entering the combustion chamber is determined only by the relative volume flows and the local flow cross-sections of the respective streams at the intake valve.

9. An internal combustion engine as claimed in claim 8, wherein the flow obstructing means comprise a butterfly throttle having a perforated plate to provide a predetermined obstruction to gas flow in its closed position and movable to an open position in which the gas flow is substantially unobstructed.

10. A stratified charge internal combustion engine comprising at least one cylinder having two intake valves (14) per cylinder, and two manifolds having branches (22,32) supplying first and second gas streams to the respective intake valves (14) of each cylinder, the two streams entering the cylinder separately through different valves so as to produce a stratified charge within the engine cylinder, the first stream supplied by the first manifold comprising air within which fuel to be burnt is dispersed and the second stream supplied by the second manifold comprising dilution gases, wherein each of the two manifolds has a plenum chamber (24,34) and the plenum chambers of the two manifolds are connected to a common air supply throttle (50), and wherein the plenum chamber (34) of the second manifold is additionally connected to an exhaust gases recirculation (EGR) pipe (84) from the exhaust system of the engine through an EGR throttle (54), the EGR pipe (84) supplying exhaust gases directly into the second stream to form part of the gases in the second stream, characterised in that EGR throttle (54) and the air supply throttle (50) are of similar design and are mechanically ganged for operation in synchronism with one another, and in that the gas pressure in the EGR pipe (84) upstream of the EGR throttle (54) is regulated by a pressure regulator (90), whereby the quantity of air in the first stream supplied by the first manifold as a fraction of the total quantity of air supplied to the two manifolds is variable by the setting of the pressure regulator (90) which determines the quantity of EGR flow as a fraction of the total air flow.

11. An internal combustion engine as claimed in claim 2, wherein the respective first and second intake ports are designed to give substantially parallel swirling flows, travelling at different relative velocities in proportion with their respective swirl radii into the combustion chamber, so as to produce a layered swirling charge motion undergoing substantially solid body rotation within the combustion chamber and wherein flow obstructing means are provided in each branch of the first manifold to vary the relative effective flow cross-sections of the first and second manifolds in order to vary the relative volume flows of the first and second streams, the flow obstructing means being positioned at a sufficient distance upstream of the associated intake port for the increased velocity at the flow obstructing means to be dissipated before reaching the intake valve, such that the relative velocities of the first and second streams through the respective intake valves entering the combustion chamber is determined only by the relative volume flows and the local flow cross-sections of the respective intake valves.

12. An internal combustion engine as claimed in claim 10, wherein the air supply throttle (50) and the EGR throttle (54) are both constructed as butterfly throttles.

13. An internal combustion engine as claimed in claim 12, wherein fuel is metered in dependence upon the estimated quantity of air supplied to the first gas stream.

14. An internal combustion engine as claimed in claim 13, wherein fuel is metered stoichiometrically with the estimated quantity of air supplied to the first gas stream.

15. An internal combustion engine as claimed in claim 13, wherein fuel is metered as a spray into the plenum chamber (24) of the first manifold.

16. An internal combustion engine as claimed in claim 13, wherein fuel is separately metered as a spray into each branch (22) of the first manifold.

* * * * *